Aug. 15, 1939.   A. N. SPANEL   2,169,475
METHOD FOR MAKING RUBBER ARTICLES
Filed Dec. 13, 1935   2 Sheets-Sheet 1
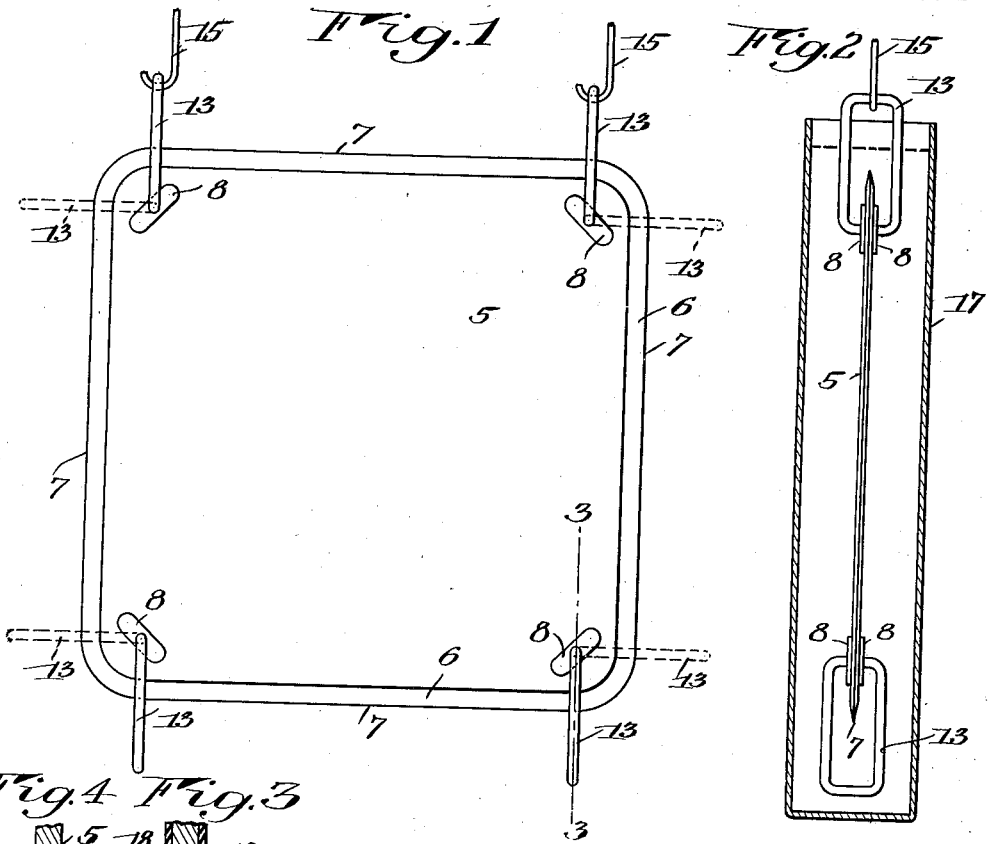
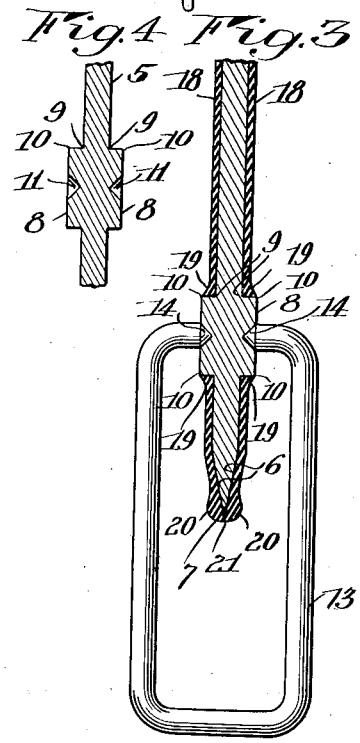
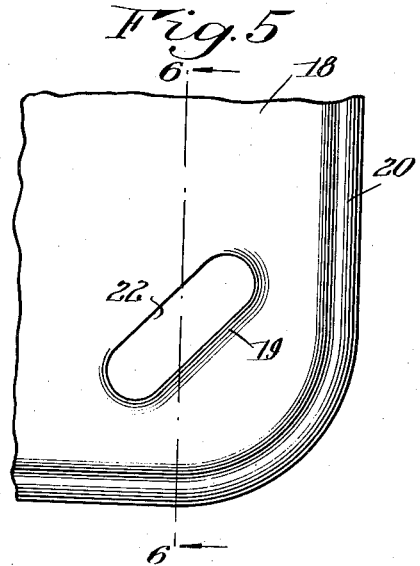
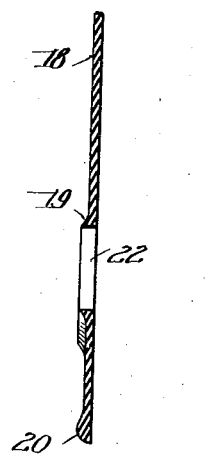
INVENTOR.
Abraham N. Spanel
BY D. Clyde Jones
his ATTORNEY.

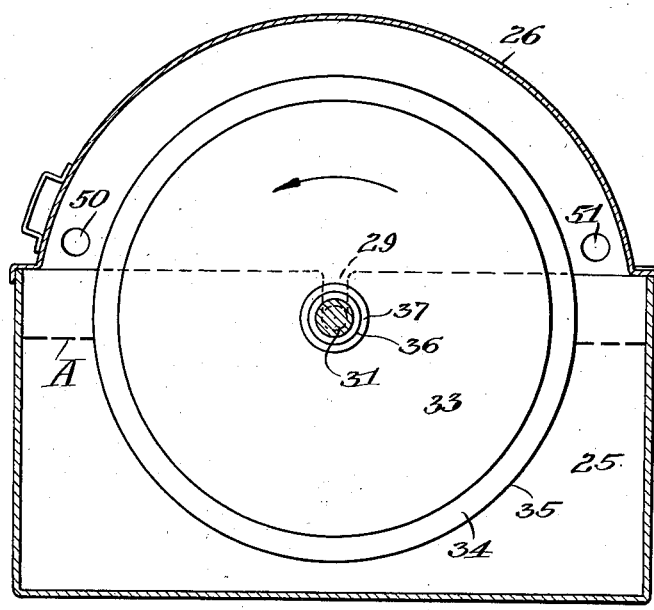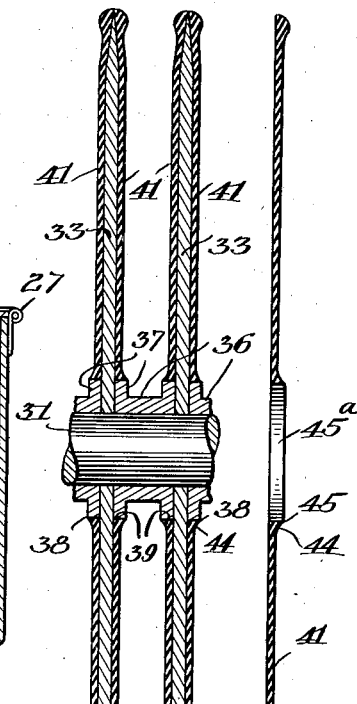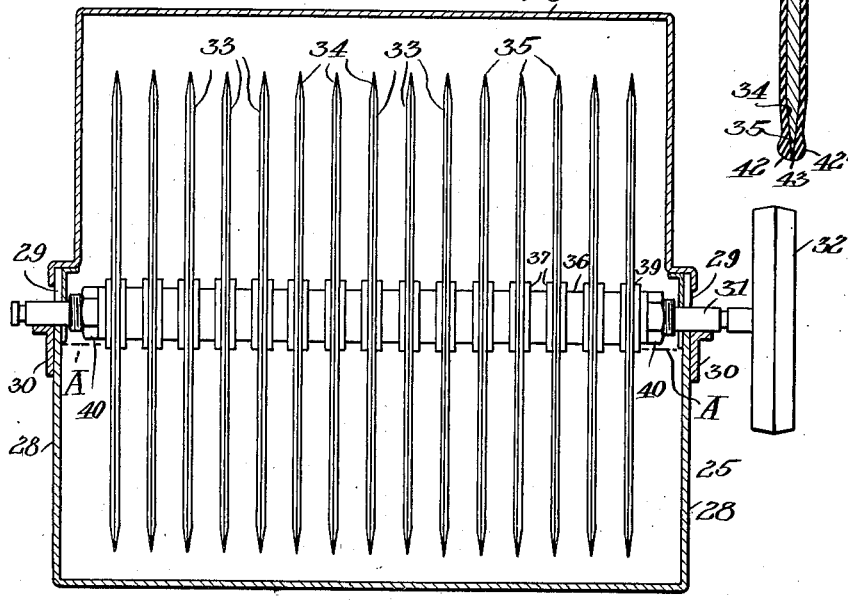

Patented Aug. 15, 1939

2,169,475

UNITED STATES PATENT OFFICE 2,169,475

METHOD FOR MAKING RUBBER ARTICLES

Abraham N. Spánel, Rochester, N. Y.

Application December 13, 1935, Serial No. 54,280

9 Claims. (Cl. 18—58)

This invention relates to a method of and to apparatus for making deposited rubber articles.

Prior methods of manufacturing deposited rubber articles with reinforced margins, have been relatively expensive due to the required use therein of complicated molds for generating reinforced margins on the articles.

The present invention has for its purpose the provision of an inexpensive method and simple inexpensive forms for use therein whereby deposited rubber articles can be expeditiously manufactured in large quantities at low cost.

The main feature of the invention relates to a method of making a deposited rubber article having a reinforced edge portion which comprises dipping a sheet-like form having a sharp or knife edge, into a bath of an aqueous dispersion of rubber and supporting the form after it is removed from the rubber bath so that the liquid rubber tends to drain toward said knife edge, said edge extending in a direction parallel to a principal plane of said form.

Another feature of the invention relates to novel forms for use in the present method.

Other features and advantages of the invention will appear from the detailed description and claims when taken with the drawings in which Fig. 1 is a front elevation of a form constructed according to the present invention and adapted to make rubber sheets or rubber table covers; Fig. 2 is a side elevation of this form in a receptacle containing a bath of liquid rubber, the receptacle being shown in vertical section; Fig. 3 is a fragmentary vertical section through the form proper taken substantially on the line 3—3 of Fig. 1 showing the mounting of a detachable supporting loop and having a coating of rubber applied thereto; Fig. 4 is a fragmentary sectional view similar to that shown in Fig. 3 except that the detachable supporting loop has been removed therefrom and the rubber coating has been omitted; Fig. 5 is a fragmentary plan view of a rubber article which can be deposited on the aforementioned form; Fig. 6 is a section through this article taken substantially on the line 6—6 of Fig. 5; Fig. 7 is a vertical cross section and Fig. 8 is a vertical longitudinal section taken through a closed receptacle in which a series of circular forms may be dipped and dried, constituting a modified form of the invention; Fig. 9 is an enlarged sectional view taken along a diameter of two of these circular forms illustrating their mounting on a rotatable support and showing a rubber coating deposited on the forms; and Fig. 10 is a section through one of the articles deposited on one surface of one of said last-mentioned forms.

Referring especially to Fig. 1, the numeral 5 designates a rectangular form or plate with rounded corners, made of commercial sheet aluminum or stainless steel of any convenient thickness. The margin of each surface of the form is preferably bevelled as indicated at 6 so that it tapers to substantially a knife edge 7. A pair of opposing bosses 8, 8 is provided on opposite surfaces of the form near each corner thereof and each such boss is formed with a depression 11 therein. Each boss 8 which is preferably of flattened elliptical outline, projects abruptly from the body of the form to define a recess or junction 9 and terminates in an abrupt edge 10. A supporting rectangular loop 13 is provided with opposing points 14 adapted to frictionally engage the depressions 11 in each pair of bosses. Each loop is of sufficient width to prevent the surface of the form from contacting adjacent forms or a wall of the bath during dipping. This loop is slightly resilient so that it can be detached from its pair of bosses when it is desired to strip the rubber layer from the form. It will be noted that the loop 13 is of such length that it can swing from the vertical position as shown to a position indicated in dotted lines so that each loop can serve to support the form in two different positions.

In using this form in the manufacture of dipped rubber articles, the form is suspended by a pair of loops 13 from suitable hooks 15 provided on a rack (not shown), arranged to raise and lower the form and also to transport it to a drying chamber as desired. By means of the mentioned rack, the form is immersed in a bath of latex or an aqueous dispersion of rubber, contained in the receptacle 17. Although the receptacle herein shown is of small size and although only one form is illustrated as being dipped therein, it will be understood that in practice the rack will have a plurality of forms supported thereon and that the receptacle will be of such size that this plurality of forms can be dipped simultaneously therein.

The form 5 is first dipped vertically into the latex bath in the position shown and then removed from the bath. The rubber coating on the form after it is removed from the latex bath tends to drain toward the lower knife edge of the form. After this coating has "set" or dried, the form is turned through ninety degrees until it can be supported on the rack by the loops 14 indicated in dotted lines at the right of Fig. 1.

With the form in this position, it is again dipped into the latex bath and then removed therefrom. After removal from the bath the liquid rubber tends to drain toward the portion of the knife edge of the form which is now in the lowermost position. When the second coating of rubber is "set" or dried, the form is again turned through ninety degrees until it is supported by the loops 14 shown in full lines at the bottom of Fig. 5; thereafter, the dipping and draining operation is repeated so that the rubber drains toward a third portion of the knife edge. The form is then turned through ninety degrees a third time so that it can be supported by the loops 13 indicated in the dotted line position at the left of Fig. 1. The step of dipping and draining is then repeated with the form in this last-named position. The sequence of steps just described can be repeated until a layer of rubber 18 of the desired thickness is deposited on each surface of the form. In the recesses 9 at the junction between the form and the bosses 8, the rubber will accumulate as a thickened reinforcement 19 while at the abrupt edge of each boss there will be a line of weakness in the rubber layer. On each bevelled margin of the form the rubber will accumulate as indicated at 20 while at the knife edge 7 there will be a line of weakness 21 in the deposited rubber. After the layer of rubber has been suitably dried on the form, the loops 13 are detached from their respective bosses. The rubber layer (not shown) on the faces of these bosses is torn away as far as the abrupt edge 10 leaving an opening 22 in the deposited layer 18. The layer 18 on each face of the form is then stripped away by tearing at the line of weakness 21 therein, thereby providing two articles on each form. It will be noted especially from Fig. 6 that the accumulation 20 at the margin of each layer is semi-pear shaped or semi-oval in cross section.

In the modified form of the invention shown in Figs. 7, 8, 9 and 10, a receptacle 25 is provided. This receptacle which is open at its top is normally closed by a cover 26 hingedly connected at 27 to one side of the receptacle. The ends 28 of the receptacle are provided with slots 29 and with suitable bearings 30 at the bottoms of these slots. A shaft 31 adapted to be rotated by a pulley 32 from any convenient source of power (not shown) is supported at its ends in the slots 29 to rotate on the bearings 30. The portion of the shaft within the receptacle 25 has mounted thereon a series of forms 33 preferably made of sheet material cut into circular form. The margin of each form is bevelled as indicated at 34 to a knife edge 35 and each form has a central opening therein through which the shaft 31 may be inserted. Each form is separated from its neighbor by a spool shaped collar 36, best illustrated in Fig. 9. Each collar at each end thereof is provided with a thickened flange 37 provided with an abrupt edge 38 which flange with an adjacent face of the form defines a recess 39. A series of forms separated by such spacing collars are securely held on the shaft by clamping nuts 40 which engage threaded portions of the shaft 31. By this construction the series of forms can be readily assembled on the shaft and after the forms have been suitably coated with rubber and then dried, the forms may be disassembled from the shaft to remove the rubber coatings from the surfaces of the forms.

In making rubber articles according to this modified method of the invention, the forms are assembled on the shaft 31 mounted in the receptacle 25, as best indicated in Fig. 8 and with a bath of latex or an aqueous dispersion of rubber in the receptacle 25 to a depth indicated by the dotted line A in Figs. 7 and 8. The shaft with the forms thereon is then rotated slowly by the pulley 32. A heated or drying atmosphere such as hot air is circulated through the upper part of the receptacle through the openings 50 and 51. In this manner while the lower portions of the forms are being coated with rubber, the deposited rubber coating on the upper portions thereof is being "set" or dried so that successive portions of the forms are continuously being coated and "set" or dried. This operation is continued until a layer 41 of rubber of the desired thickness, is deposited on each surface of the form. The rubber coating will tend to drain downwardly as each successive portion of the form leaves the latex bath and will accumulate as a thickened ridge 42 on the beveled margins 34 of the form while at the sharp edge 35 thereof, a line of weakness 43 will develop in the deposited coating. In each of the recesses 39 at each collar 36, the rubber will accumulate as indicated at 44 while at each abrupt edge 38 on the flanges of the collar 36 there will be a line of weakness in the rubber coating so that when the excess rubber (not shown) on the central portion of the collar is stripped away there will be a torn or feather edge 45 in which the ridge 44 terminates. After the rubber coating on the forms has been suitably dried, the shaft with the forms thereon is removed from the receptacle and disassembled by removing the left hand clamping nut 40. The layer of rubber 41 is then stripped away from the exposed surface of the form at the extreme left hand side of Fig. 8. When this coating has been thus stripped away, it will provide a circular article with a central opening 45 therein, with all margins thereof reinforced with an accumulation of rubber. The last mentioned form can then be removed from the shaft. The coating on the right hand surface of this last-mentioned form is then stripped therefrom and trimmed at the line of weakness developed by the abrupt edge 38 thereby providing a second article of the character shown in Fig. 10. Each succeeding form on the shaft 30 is removed therefrom and the rubber coatings thereon are stripped therefrom and trimmed to provide two complete articles. This operation is continued until all of the forms have been removed from the shaft and the rubber coatings thereon stripped away. The forms and spacing collars can then be reassembled and thereafter replaced in the receptacle as illustrated in Fig. 8. The described cycle of operations can thus be continued indefinitely.

It should be understood that by this method, any shaped article, circular included can be produced.

The present disclosure is given merely by way of example and is not to be taken in a limiting sense for there may be many variations and modifications within the scope of the appended claims without departing from the spirit of the present invention.

What I claim is:

1. The method of making a sheet-like article of thin rubber having a reinforced edge which comprises providing a plate having a knife edge to generate an edge reinforcement on said article, rotating said plate with a substantial part of its lower portion dipping into a bath of an aqueous dispersion of rubber and with its upper portion projecting out of the bath, continuing said rotation one or more revolutions until a rubber layer of the desired thickness is deposited on each side of said plate, drying said layers, and removing the layers from said plate.

2. The method of making a sheet-like article of thin rubber having a reinforced edge which comprises providing a plate having its margin bevelled to substantially a knife edge to generate an edge reinforcement on said article, rotating said plate with a substantial part of its lower portion dipping into a bath of an aqueous dispersion of rubber and with its upper portion projecting into a setting atmosphere, continuing said rotation one or more revolutions until a rubber layer of the desired thickness is deposited on each surface of said disk, drying said layers, and removing the layers from said plate.

3. The method of making a sheet-like article of thin rubber which comprises providing a substantially flat plate, rotating said plate with a substantial part of its lower portion dipping into a bath of an aqueous dispersion of rubber or the like and with its upper portion projecting out of the bath, continuing said rotation one or more revolutions until a rubber layer of the desired thickness is deposited on the sides of said plate, drying said layer, and removing the layer from said plate.

4. The method of making a sheet-like article of thin rubber having a reinforced edge which comprises providing a plate having an abrupt edge for generating an edge reinforcement for said article, rotating said plate with a substantial part of its lower portion dipping into a bath of an aqueous dispersion of rubber or the like and with its upper portion projecting out of the bath, continuing said rotation one or more revolutions until a rubber layer of the desired thickness is deposited on each side of the plate, drying said layers, and removing the layers from said plate.

5. The method of making a sheet-like article of thin rubber having a reinforced edge which comprises providing a plate having edge reinforcement generating means, rotating said plate with a substantial part of its lower portion dipping into a bath of an aqueous dispersion of rubber or the like and with its upper portion projecting out of the bath, continuing said rotation one or more revolutions until a rubber layer of the desired thickness is deposited on the sides of said plate, drying the layer and removing the layer from said plate.

6. The method of making sheet-like articles of rubber having at least a portion of the edges thereof strengthened by an accumulation of rubber which method comprises immersing a substantial portion of a plate into a liquid rubber dispersion to deposit a layer of rubber thereon, the two opposite surfaces of said plate converging at the margin thereof to meet in a common abrupt edge, removing said plate from said dispersion with a coating of rubber deposited thereon, vertically supporting said plate with a portion of said edge lowermost whereby a portion of the rubber deposited on said surfaces flows toward said lowermost portion of said edge and accumulates in a thickened reinforcing section of deposited rubber on each surface of said plate joined over said portion of said edge by a thinner section of rubber, subsequently drying the rubber, parting the rubber at said thinner section, and removing the rubber from said plate.

7. The method of making sheet-like articles of rubber having reinforced edges which comprises depositing a sheet-like layer of liquid rubber on opposite surfaces of a plate having opposite surfaces converging at the margin and meeting along a line to form a knife edge, supporting said plate in a substantially vertical position with a portion of said edge lowermost whereby a portion of the rubber deposited on said surfaces flows toward said lowermost edge portion and accumulates in a thickened reinforcing section of deposited rubber on each surface of said plate joined over said edge by a thinner section of rubber, subsequently drying the rubber, parting the rubber at said thinner section, and removing the rubber from said plate.

8. The method of making a sheet-like article of thin rubber having a reinforced edge which comprises providing a plate of polygonal outline having opposite surfaces converging toward the side edges thereof and terminating in a knife edge, depositing liquid rubber on the surfaces of said plate, supporting said plate so that the liquid rubber tends to drain toward a side edge thereof to accumulate as a thickened ridge on the rubber deposited on each surface of said plate at said edge, the thickened ridges being joined over said edge by a thinner section of rubber, setting the rubber, repeating the depositing and draining operations with respect to each side edge of said plate, subsequently partly the rubber at the thinner section, and removing the rubber thus deposited from said plate.

9. The method of making a sheet-like article of thin rubber having a reinforced edge which comprises providing a plate of polygonal outline, said plate having opposite surfaces converging toward the side edges thereof and terminating in a continuous knife edge extending in a direction substantially parallel to a principal surface of said plate, depositing liquid rubber on the surfaces of said plate, supporting said plate so that the liquid rubber tends to drain toward a side edge thereof to accumulate as a thickened ridge on the rubber deposited on the surfaces of said plate at said edge, the thickened ridges being joined over said edge by a thinner section of rubber, setting the rubber, repeating the depositing and draining operations with respect to each side edge of said plate, subsequently parting the rubber at the thinner sections and removing the rubber thus deposited from said plate.

ABRAHAM N. SPÁNEL.